US007685227B2

(12) United States Patent
Gerber et al.

(10) Patent No.: US 7,685,227 B2
(45) Date of Patent: Mar. 23, 2010

(54) MESSAGE FORWARDING BACKUP MANAGER IN A DISTRIBUTED SERVER SYSTEM

(76) Inventors: Robert H. Gerber, c/o Microsoft Corporation, Attn: [x 55838], One Microsoft Way, Redmond, WA (US) 98052; Thomas J. Miller, c/o Microsoft Corporation, Attn: [x 52762], One Microsoft Way, Redmond, WA (US) 98052

( * ) Notice: Subject to any disclaimer, the term of this patent is extended or adjusted under 35 U.S.C. 154(b) by 608 days.

(21) Appl. No.: 11/558,887

(22) Filed: Nov. 10, 2006

(65) Prior Publication Data
US 2008/0114827 A1 May 15, 2008

(51) Int. Cl.
*G06F 15/16* (2006.01)
(52) U.S. Cl. ........................ 709/201; 709/244; 709/238; 370/428
(58) Field of Classification Search .................. 709/201; 715/744
See application file for complete search history.

(56) References Cited

U.S. PATENT DOCUMENTS

| 6,026,414 A | 2/2000 | Anglin |
| 6,260,269 B1 | 7/2001 | Turnquist et al. |
| 6,496,949 B1 | 12/2002 | Kanevsky et al. |
| 6,611,923 B1 | 8/2003 | Mutalik et al. |
| 6,748,447 B1 * | 6/2004 | Basani et al. ............... 709/244 |
| 2002/0019844 A1 * | 2/2002 | Kurowski et al. ........... 709/201 |
| 2004/0223507 A1 * | 11/2004 | Kuchibhotla et al. ........ 370/428 |

FOREIGN PATENT DOCUMENTS

JP 11353202 A 12/1999

OTHER PUBLICATIONS

International Search Report, PCT Patent Application No. (PCT/US2007/077114), Dated Feb. 11, 2008, pp. 1-11.

* cited by examiner

*Primary Examiner*—Quang N. Nguyen
*Assistant Examiner*—Ruolei Zong
(74) *Attorney, Agent, or Firm*—Collins & Collins Incorporated; L. Alan Collins

(57) ABSTRACT

A distributed server system may include a primary manager, one or more backup managers communicatively coupled to the primary manager, and one or more workers communicatively coupled to the one or more backup managers. The one or more backup managers may receive a command to backup the state of the distributed server system. The backup managers may forward work tasks to the one or more communicatively coupled workers. The backup managers may further aggregate responses received from the one or more communicatively coupled workers and send the aggregated response to the primary manager.

18 Claims, 6 Drawing Sheets

MESSAGE FORWARDING BACKUP MANAGER IN A DISTRIBUTED SERVER SYSTEM

BACKGROUND

Distributed server systems may include a central server distributing work tasks to any number of communicatively coupled computer systems. The central server may be a server computer executing typical server class software applications or software services. The communicatively coupled computer systems may be discreet server class computer systems, personal computer systems, or the like. The communicatively coupled computer systems may be located in the same physical location or may be distributed at different physical locations connected by a network.

The work tasks distributed by the central server may be any type of task, command, or function call that may be executed in computer software by a computer system. For example, a work task may be a calculation, a command to store data, or the like. The central server may send a work task to a communicatively coupled computer system using any typical computer communication method. For example, the central server may send a work task using the hypertext transport protocol (HTTP), a remote procedure call (RPC) over HTTP, the distributed component object model (DCOM) system, or the like.

The central server may further execute software applications or software services to manage and/or maintain the current "state" of the distributed server system. More particularly, the central server may represent the overall distributed server system to an entity external to the distributed server system. Therefore, an external entity seeking information regarding the status of the distributed server system may communicate with the central server and the central server may respond with the current state of the overall distributed server system. The communicatively coupled computer systems may also maintain the current state of the distributed server system; however, it may not be necessary for the communicatively coupled computer systems to do so as the current state is managed by the central server. In addition, the central server may ensure the communicatively coupled computer systems are each in the same "state" with regard to each other communicatively coupled computer system.

The amount of work tasks performed by such a distributed server system may be related to the number of computer systems that are communicatively coupled to the central server. For example, each communicatively coupled computer system may have a fixed rate at which it may perform work tasks. If more total work tasks are assigned to the distributed server system than the communicatively coupled computer systems are able to perform, the distributed server system may experience a slowdown in the overall completion of work tasks. More communicatively coupled computer systems may be added to the distributed server system to increase the work task capacity of the distributed server system and may reduce such overall work task completion slowdowns.

However, the result of adding more communicatively coupled computer systems to the distributed server system may be one or more communication problems. For example, the central server may be able to efficiently send work tasks and receive communications from a small number of communicatively coupled computer systems. The work capacity of the distributed server system may increase with each added communicatively coupled computer system. Correspondingly, the amount of communications performed by the central server may also increase. As a result, the central server may not be able to efficiently manage the increased number of communications and there may be a decrease in the overall number of work tasks that may be performed by such a distributed server system.

Such a distributed server system may employ one or more backup computer systems configured to redundantly store information. Such backup computer systems may also be known as backup managers or backup servers. The backup managers or backup servers may be configured to restore the central server to a particular "state" that may have been redundantly stored. However, in communicating changes of state to the one or more backup managers or servers, the central server may also increase the total number of communications that are performed, again resulting in a decrease of communication performance within the distributed server system.

A system in which the number of communicatively coupled computer systems may be increased without adversely impacting the communication capacity of the central server may be useful.

SUMMARY

The following presents a simplified summary of the disclosure in order to provide a basic understanding to the reader. This summary is not an extensive overview of the disclosure and this summary does not identify key/critical elements of the invention or delineate the scope of the invention. The purpose of this summary is to present some concepts disclosed herein in a simplified form as a prelude to the more detailed description that is presented later.

The present example provides mechanisms and techniques for a message forwarding backup manager in a distributed server system. A server may be a computer system that implements and executes software services on the behalf of other computer systems. Such other computer systems may be known as clients, other servers, or the like. A server may be communicatively coupled to other computer systems using a typical computer communications network such that the other computer systems may communicate requests to the server. The server may prepare and communicate an appropriate response to the requests.

A distributed server may include either a single computer system executing one or more server software services, a number of computer systems communicatively coupled to a central server, or the like. A primary manager server in the distributed server system may be communicatively coupled to one or more other computers systems or servers. The primary manager may receive client requests and either delegate whole operations or portions of operations to communicatively coupled computer systems. The communicatively coupled computers systems may perform the operation and send a message in response indicating success or failure. Such operations or portions of operations may be known as "work".

The primary manager may also maintain the "state" of the distributed server system. Such a state may refer to the current status of information or software applications managed by the primary manager. For example, the central manager may maintain the current state of a database stored by the distributed server system.

Any number of the communicatively coupled computer systems may be designated to act as backup managers or backup servers. A primary manager may send instructions or information to redundantly store information related to the state of the distributed server system to one or more such backup managers. The primary manager may also send any other information or data to one or more backup managers. In the event any of the state information, instructions, or data is lost or corrupted on the primary manager, the state information, instructions, or data may be recovered from any of the backup managers. Such backup managers may also include executable instructions to notify the primary manager that the backup operation was successful.

The primary manager may be communicatively coupled to one or more such backup managers. Each of the backup servers may be communicatively coupled to one or more worker computers systems, also referred to as "workers". The primary manager may communicate a command to the one or more backup managers to begin an operation to close an identifier associated with the current "state" of the distributed server system. The command may further include instructions to persist, or store, the current state of the distributed server system.

Once each backup server has completed the operation associated with the command, each backup server may send a message indicating success or failure back to the primary manager. The primary manager may wait until all backup servers have responded, or, if one or more backup servers is non-responsive, the primary manager may choose to reassign any workers assigned to the non-responsive to a responsive backup server. In an alternative embodiment, the primary manager may only note that a backup server has not responded and may wait until a later time to reassign any workers assigned to the non-responsive backup server.

The primary manager may then communicate a command to each of the one or more backup managers to broadcast the "work". Such "work" may be a task or operation associated with the current task or operation represented by the current state identifier. Each of the backup managers may then forward the command to perform the work to each of the one or more communicatively coupled workers. As each worker completes the work, each worker may either independently determine new work or may communicate with other workers to determine any new work that may need to be performed. Each worker may then communicate with the backup manager to which the worker is assigned, confirm the work associated with the current state identifier was completed, and may request new work.

Each of the one or more backup managers may then aggregate the information received from each of the one or more workers. In the event one of the workers was non-responsive, a backup manager may add information regarding the non-responsive status to the aggregated information. Each of the one or more backup servers may then communicate with the primary manager to indicate the current state identifier is closed. Each of the one or more backup managers may also forward any new work requests received from any of the workers.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a message forwarding backup manager in a distributed server system, the system described is provided as an example and not a limitation. As those skilled in the art will appreciate, the present examples are suitable for application in a variety of different types of dynamic fragment mapping systems.

Figure 1:
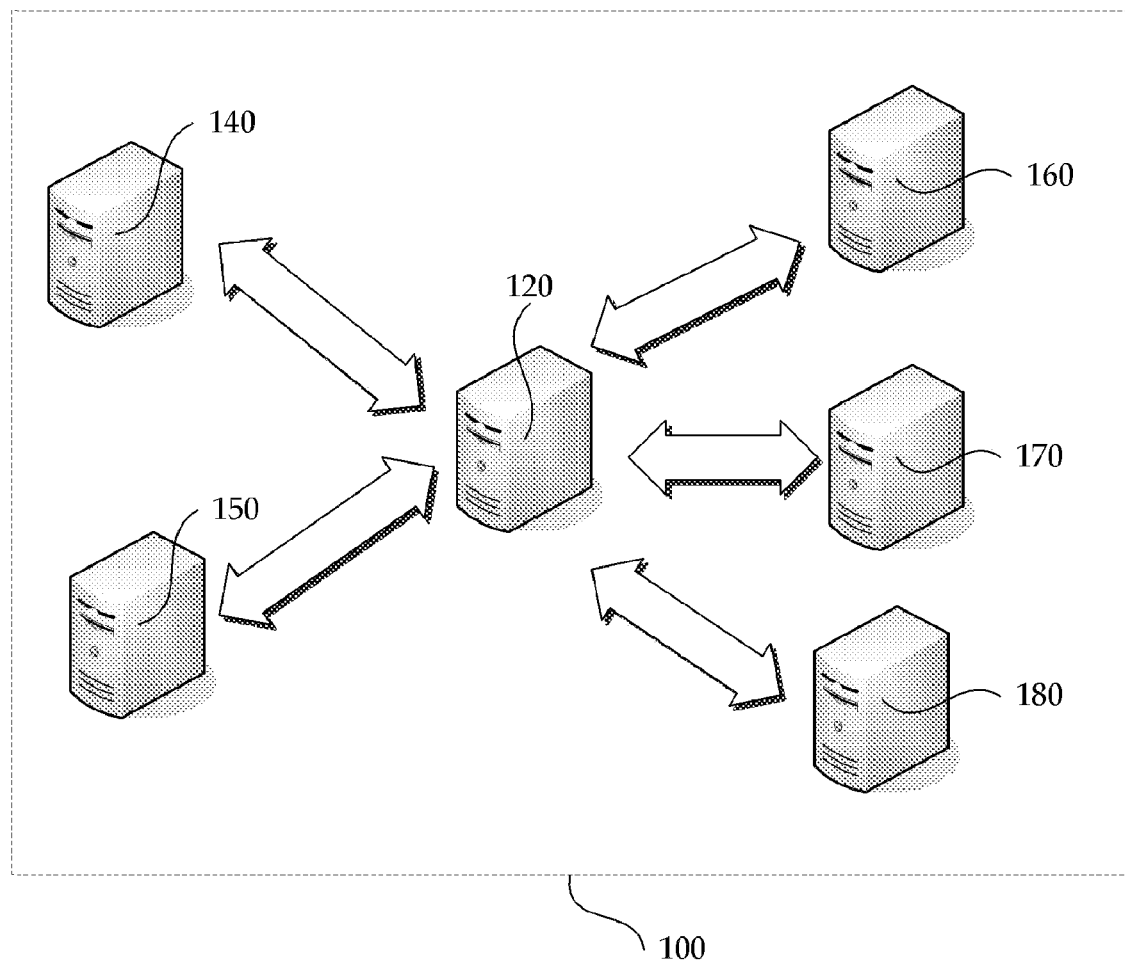
FIG. 1 is a block diagram showing a conventional distributed server system.

FIG. 1 is a block diagram showing a conventional distributed server system 100. The conventional distributed server system 100 may include a conventional central server 120, a conventional backup server 140, a conventional backup server 150, a conventional server 160, a conventional server 170, and a conventional server 180.

Within the example conventional distributed server system 100, each of conventional backup server 140 and conventional backup server 150 may be communicatively coupled to the conventional central server 120. Each of the conventional server 160, conventional server 170, and conventional server 180 may also be communicatively coupled to the conventional central server 120. Such a conventional distributed server system 100 may be logical in nature; that is, such communicative couplings may not physically exist and instead such communicative couplings may be indicative of the sequence of communication between participants in the conventional distributed server system 100.

The conventional distributed server system 100 may be any type of conventional distributed server architecture. For example, the conventional distributed server system 100 may be a conventional distributed database server system, a conventional distributed media server system, or the like. The conventional central server 120 may be any type of conventional server computer system constructed to provide software services to other computer systems. The conventional central server 120 may receive a request from an external entity.

The conventional central server 120 may send a request to any of conventional server 160, conventional server 170, and/or conventional server 180 to perform a task. Each of conventional server 160, conventional server 170, and/or conventional server 180 may perform the task and respond to the conventional central server 120 indicating completion of the task. Furthermore, the conventional central server 120 may send a command to backup, or, redundantly store information to any of conventional backup server 140 and/or conventional backup server 150.

Any number of conventional servers may be added to the conventional distributed server system 100 to increase the overall task performance capacity of the conventional distributed server system 100. As more conventional servers are communicatively coupled to the conventional central server 120, the amount of communications sent and received by the conventional central server 120 may increase to the point at which the conventional central server 120 experiences communication slowdowns.

A system in which more conventional servers may be added to a distributed server system without a corresponding communication bottleneck may be useful.

Figure 2:
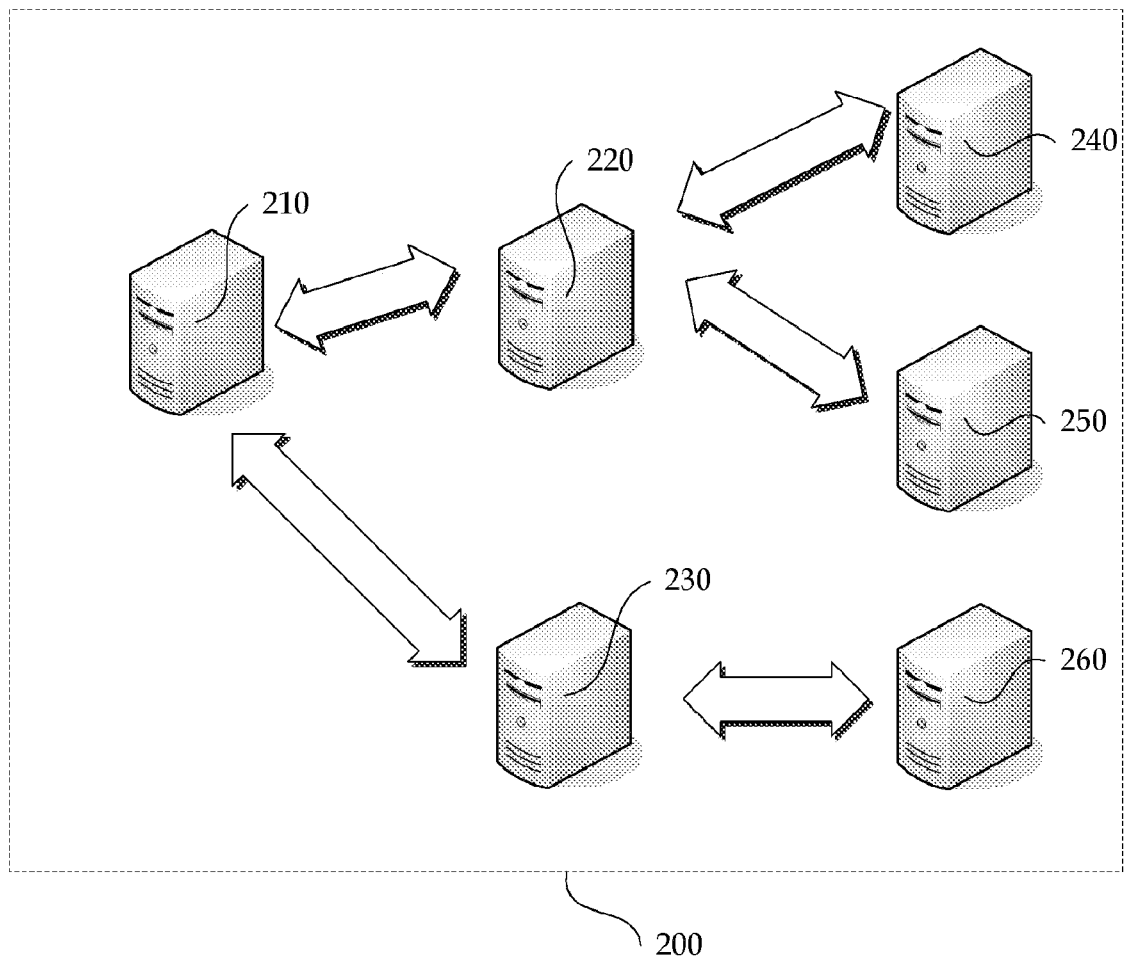
FIG. 2 is a block diagram showing an example message forwarding backup server in a distributed server system.

FIG. 2 is a block diagram showing an example message forwarding backup server in a distributed server system 200. The distributed server system 200 may include a primary manager 210, a backup manager 220, a backup manager 230, a worker 240, a worker 250, and a worker 260.

Within the distributed server system 200, the primary manager 210 may be communicatively coupled to each of backup manager 220 and backup manager 230. The backup manager 220 may be communicatively coupled to each of the worker 240 and worker 250. The backup manager 230 may be communicatively coupled to the worker 260. Such a distributed server system 200 is an example only. Any number of backup managers may be communicatively coupled to the primary manager 210. Also, any number of workers may be communicatively couple to the any number of backup managers. For example, the number of backup servers may be the square root of the number of agent servers. Such a distributed server system 200 may also be logical in nature; that is, such communicative couplings may not physically exist and instead such communicative couplings may be indicative of the sequence of communication between participants in the distributed server system 200.

Each of the communicative couplings may be made using a computer network such as a wide area network (WAN), local area network (LAN), or the like. In an alternative example, each of the primary manager, backup manager, and workers may be software services executing on a single computer system, and each of the communicative couplings may be made using the software communication services included in an operating system such as Microsoft Windows™.

The primary manager 210 may be a server computer system executing a server class operating system and associated software services. The primary manager 210 may further execute software services to generate and manage one or more identifiers associated with a "state" of the distributed server system 200. Such a state may refer to a discreet snapshot or temporal representation of the information managed and maintained by the primary manager 210 on behalf of the distributed server system 200. That is, a state may represent the arrangement of any number of data, instructions, or the like at a given point in time in the system. As such, the primary manager 210 may assign an identifier corresponding to the state that may uniquely identify the state of the distributed server system 200 at a particular point in time.

The primary manager 210 may also be configured to manage and distribute work "tasks". Work "tasks" may be any type of functionality that may be executed by a computer system. For example, "work" may be a numerical calculation, a command to store data or other information, or any other type of computer software function. The primary manager 210 may further associate work with a state identifier. In particular, the primary manager 210 may equate a current state and the current state identifier with the aggregate amount of work performed. More particularly, the current state of the distributed server system 200 may correspond to the cumulative sum of each discreet unit of "work" performed since the state of the distributed server system 200 was initialized.

The primary manager 210 may send a request to each of the backup manager 220 and the backup manager 230 to persist the state associated with a state identifier. Each of the backup manager 220 and the backup manager 230 may be configured to redundantly store each state identifier and the state associated with the state identifier received from the primary manager 210. In this manner, either of the backup manager 220 or backup manager 230 may replace and assume the function of the primary manager 210 should the primary manager 210 experience a failure which causes the primary manager 210 to cease functioning. In addition, once each of the backup manager 220 and the backup manager 230 may have communicated to the primary manager 210 that the state has been persisted, the primary manager 210 may communicate a command to each of the backup manager 220 and the backup manager 230 to broadcast the work associated with the current state identifier to each of the worker 240, the worker 250, and/or the worker 260.

Each of the worker 240, the worker 250, and the worker 260 may be a computer system capable of executing the functionality associated with the work task received from any of the backup manager 220 and/or the backup manager 230. Furthermore, each of the worker 240, the worker 250, and the worker 260 may also be communicatively coupled and may be capable of sharing information, data, or the like with one another. Once each of the worker 240, the worker 250, and the worker 260 has completed their assigned work task, each may communicate such information back to either of backup manager 220 or backup manager 230.

Each of the backup manager 220 and the backup manager 230 may aggregate the responses received from any of the worker 240, the worker 250, or the worker 260. Each of the backup manager 220 and the backup manager 230 may then send the aggregated response back to the primary manager 210. In the event any of the worker 240, the worker 250, the worker 260 are slow to respond or fail to respond, each of the backup manager 220 or the backup manager 230 may include information indicating the identity of the slow to respond or failing worker in the aggregated response.

As discussed earlier, each of backup manager 220 and backup manager 230 may back up or redundantly store the state of the distributed server system 200 and may assume the role of the primary manager 210 at any time. Therefore, the configuration of the distributed server system 200 may be dynamic and the communicative couplings may change to reflect slow or failing managers or workers included in the distributed server system 200. That is, the communicative couplings between the primary manager 210 and the backup manager 220 and backup manager 230 may be reconfigured such that either of the backup manager 220 or the backup manager 230 may assume the functional responsibilities of the primary manager 210.

As previously discussed, the primary manager 210 may examine the aggregate of responses and determine that a worker is slow or non-responsive. The primary manager 210 may then inform the corresponding backup manager to remove the slow to respond or failing worker from the distributed server system 200. The primary manager 210 may then issue a new broadcast message to each of the remaining workers to perform the work that was assigned to the slow or failing worker such that all the work associated with a state may be completed.

Figure 3:
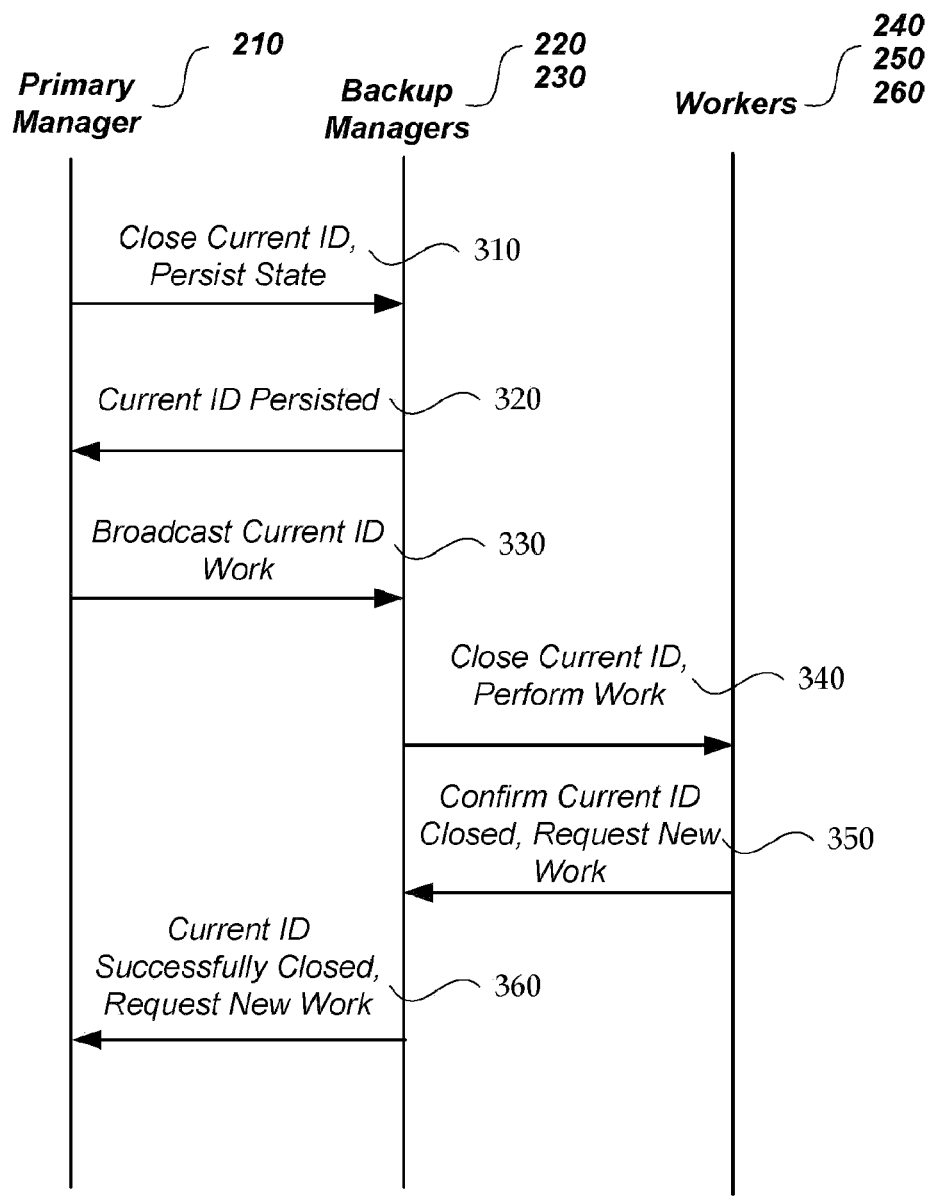
FIG. 3 illustrates example communications associated with closing an identifier associated with the state of the distributed server system as in FIG. 2.

The functionality described may be implemented on any number of server computer systems. For example, one computer system may execute software services related to a central manager, a backup manager, a worker, or any combination thereof. FIG. 3 illustrates example communications associated with closing an identifier associated with the state of the primary manager 210 as in FIG. 2.

A primary manager 210 of FIG. 2 may send a command 310 to any of backup manager 220 of FIG. 2 or backup manager 230 of FIG. 2. Such a command may include instructions to begin closing the state associated with a state identifier as discussed with respect to FIG. 2. Such a command may further include a command to persist the state associated with the current state identifier.

Each of the backup manager 220 and the backup manager 230 may then persist the state as requested by the primary manager 210. Once each of the backup manager 220 and the backup manager 230 have persisted the state associated with the current state identifier, each of the backup manager 220 and the backup manager 230 may send a response 320 indicating the state associated with the current state identifier has been persisted. The primary manager 210 may wait for all responses to be received from each of the backup managers before proceeding.

The primary manager 210 may then send a command 330 to each of the backup manager 220 and the backup manager 230 indicating each of the backup manager 220 and the backup manager 230 may now broadcast the work corresponding to the state associated with the state identifier to each of the workers. Each of the backup manager 220 and the backup manager 230 may then send a command 340 to each of the worker 240 of FIG. 2, the worker 250 of FIG. 2, and the worker 260 of FIG. 2 to being closing the state associated with the current state identifier and to perform the work associated with the current state identifier assigned to the worker. The command 340 sent to each worker may be identical and each worker may disregard any non-assigned portion of work sent as part of the command 340. In an alternative implementation, the command 340 may be generated individually for each of the workers and may include only the work assigned to the worker to which the command 340 was sent.

Once each of the worker 240, the worker 250, and the worker 260 have completed the work, each may locally close the state associated with the current state identifier. Each of the worker 240, the worker 250, and the worker 260 may then determine any additional work to be performed. Such a determination may be made when each of the worker 240, the worker 250, and the worker 260 communicate with one another. In an alternative implementation, each of the worker 240, the worker 250, and the worker 260 may independently examine the state associated with the current state identifier and determine any additional work to be performed. Each of the worker 240, the worker 250, and the worker 260 may send a message 350 to their assigned backup manager, either the backup manager 220 or the backup manager 230, indicating each of the worker 240, the worker 250, and the worker 260 have closed the state associated with the current state identifier. Such a message may also include a request for any additional new work to be performed.

Each of the backup manager 220 and the backup manager 230 may then send a message 360 to the primary manager 210 indicating the state associated with the current state identifier has been closed. Also, the message 360 may include any new work to be performed as received from the workers.

Figure 4:
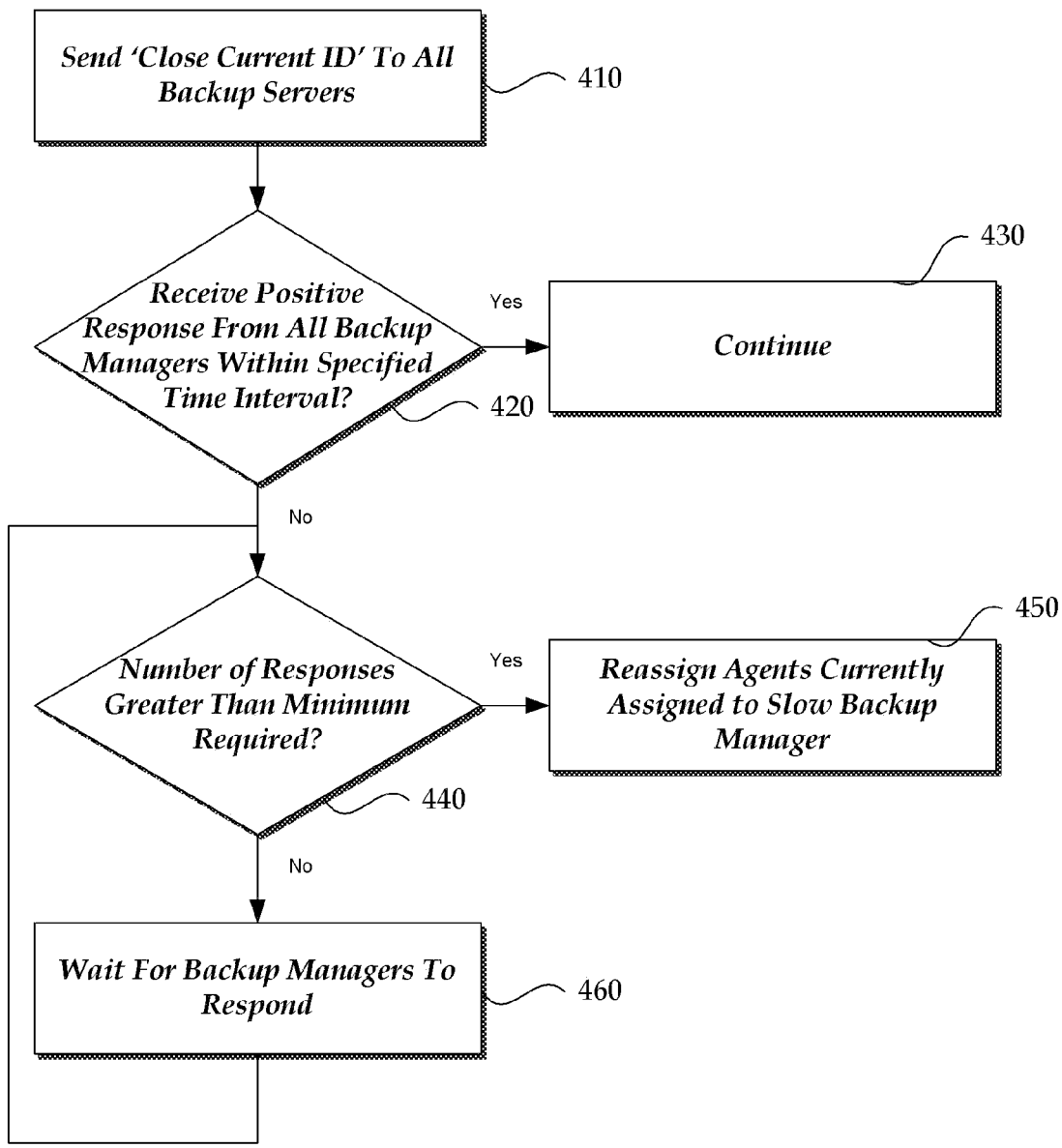
FIG. 4 illustrates an example method for a primary manager to handle a slow or non-responsive backup manger.

FIG. 4 illustrates an example method 400 for a primary manager to handle a slow or non-responsive backup manger. Such a primary manager may be the primary manager 210 of FIG. 2.

Block 410 may refer to an operation in which a command to close the state associated with a current state identifier is sent to one or more backup managers. Such backup managers may be the backup manager 220 of FIG. 2 and the backup manager 230 of FIG. 2. Such a close current state identifier command may be a command 310 of FIG. 3 or a command 330 of FIG. 3.

Block 420 may refer to an operation to determine whether or not a response was received within a predetermined time interval. Such a time interval may be any length. Alternatively, such a time interval may be associated with an expected overall level of performance of the distributed server system. In response to a positive determination, flow continues on to block 430. In response to a negative determination, flow continues on to block 440.

Block 430 may refer to an operation in which normal operation of the primary manager continues. Normal operation may refer to any operation performed in accordance with the functioning of the primary manager.

Block 440 may to an operation to determine whether or not the minimum number of responses has been received. The minimum number may be determined based on any information, including the overall number of backup managers included in the distributed server system, the number of workers connected to the backup managers, or the like. In response to a positive determination, flow continues on to block 450. In response to a negative determination, flow continues on to block 460.

Block 450 may refer to an operation in which a slow or non-responsive backup manager is bypassed. Such a bypass may be performed by temporarily reassigning any workers assigned to the slow or non-responding backup manager to a responsive backup manager.

Block 460 may refer to an operation in which it has been determined that the number of backup managers is too low to ensure a predetermined level of performance within the distributed database system or is too low for the distributed database system to function correctly. The operation may also include an operation in which a predetermined period of time is waited. Should no additional backup managers respond within the wait time, the distributed database system may halt functioning until such time as additional responsive backup managers may be added. Flow may continue back to 420.

Figure 5:
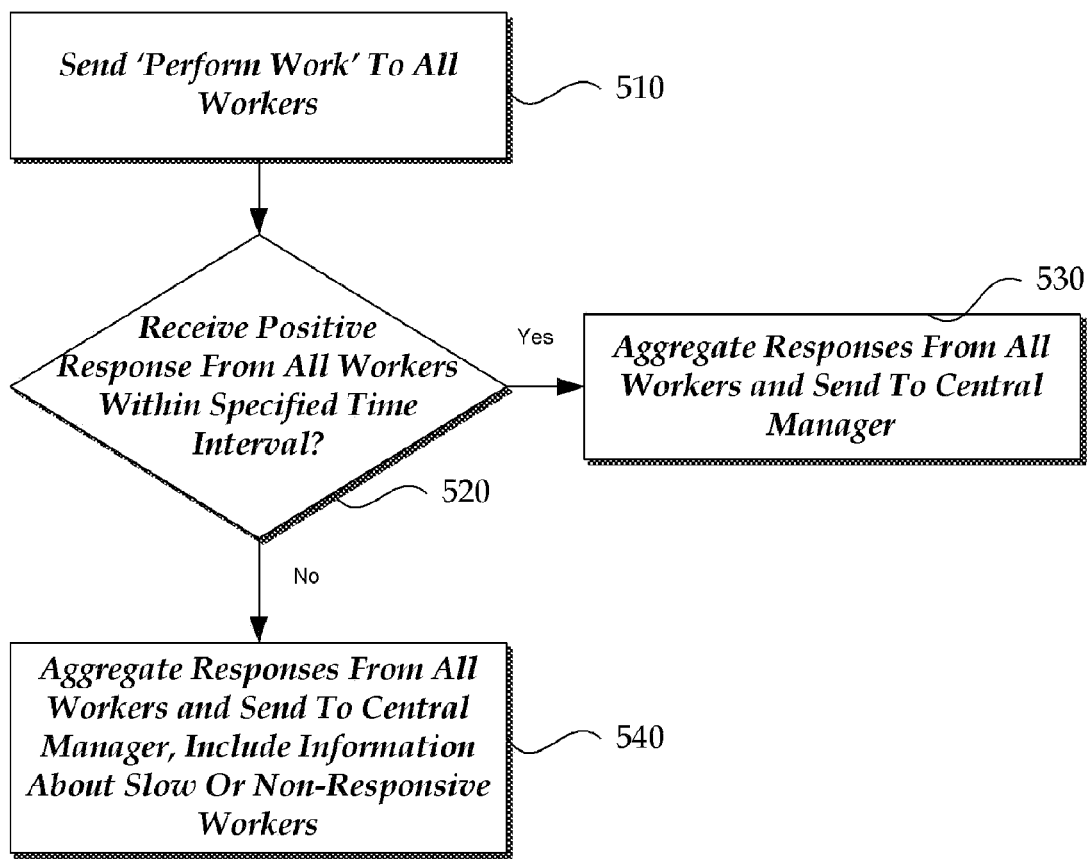
FIG. 5 illustrates an example method for a backup manager to handle a slow or non-responsive worker.

FIG. 5 illustrates an example method 500 for a backup manager to handle a slow or non-responsive worker. Such a backup manager may be the backup manager 220 of FIG. 2 or the backup manager 230 of FIG. 2. Such a worker may be the backup manager 230 Block 510 may refer to an operation in which a command to perform work corresponding to a state is sent to one or more workers. In an alternative embodiment, a command is sent indicating the worker should close the state associated with the current state identifier. However, the operation may include any command that may require a response from a worker.

Block 520 may refer to an operation to determine whether or not each worker which was sent the command in block 510 has responded within a predetermined time interval. Such a time interval may be any time interval, and may be associated with an overall level of performance associated with the distributed server system. In response to a positive determination, flow continues to block 530. In response to a negative determination, flow continues to block 540.

Block 530 may refer to an operation in which the backup manager aggregates the responses of all workers into a single message and sends the aggregated message to the central manager.

Block 540 may refer to an operation in which the backup manager aggregates the responses of all workers into a single message and sends the aggregated message to the central server. The aggregated message may include information indicating identity of any slow or non-functioning worker identified at block 520.

Figure 6:
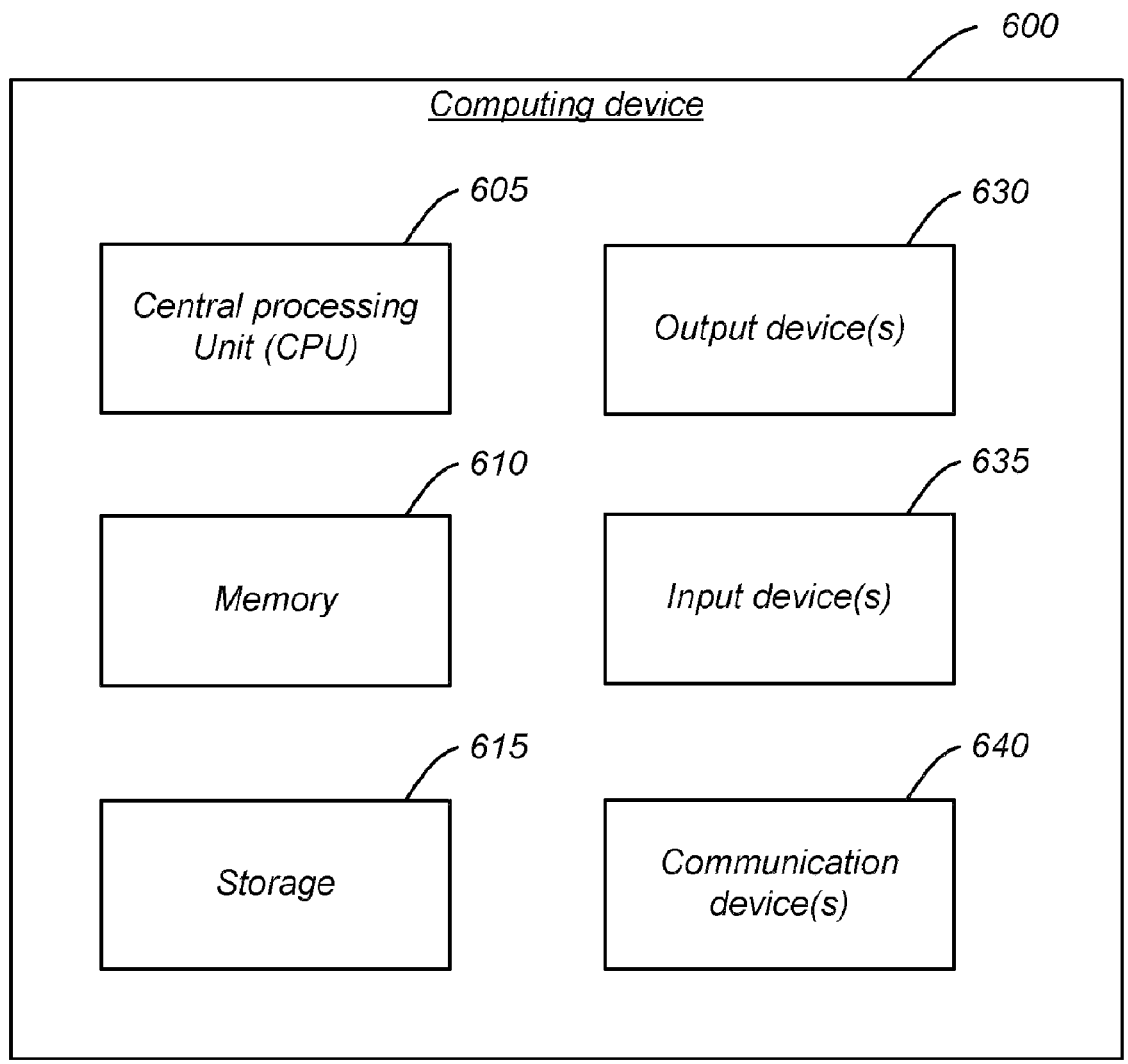
FIG. 6 shows an example computer device for implementing the described systems and methods.

FIG. 6 illustrates an example computer device 600 for implementing the described systems, methods, and software services such as any of the aforementioned server computer systems or client computer systems. In its most basic configuration, computing device 600 typically includes at least one central processing unit (CPU) 605 and memory 610.

Depending on the exact configuration and type of computing device, memory 610 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by multiple CPU's in parallel.

Computing device 600 may also include additional storage (removable and/or non-removable) including, but not limited to, magnetic or optical disks or tape. Such additional storage is illustrated in FIG. 6 by storage 615. Computer storage media includes volatile and nonvolatile, removable and non-removable media implemented in any method or technology for storage of information such as computer readable instructions, data structures, program modules or other data. Memory 610 and storage 615 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 640 that allow the device to communicate with other devices. Communications device(s) 640 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media or device-readable media as used herein includes both computer storage media and communication media. The described methods may be encoded in any computer-readable media in any form, such as data, computer-executable instructions, and the like.

Computing device 600 may also have input device(s) 635 such as keyboard, mouse, pen, voice input device, touch input device, etc. Output device(s) 630 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A distributed server computer system, comprising:
a primary manager operable to provide distributed server management software services including generating and managing an identifier associated with a state of the distributed server computer system and further including managing and distributing work tasks, wherein the primary manager associates the identifier and the state with an aggregate amount of work performed by the work tasks since the state was initialized, the primary manager being a computer system;
one or more backup managers communicatively coupled to the primary manager each operable to back up information as requested by the primary manager and forwarding at least one request in response to a request received from the primary manager; and
one or more workers communicatively coupled to the one or more backup managers each operable to receive at least one request forwarded from the primary manager by the one or more backup managers.

2. The distributed server computer system of claim 1, wherein each of the one or more backup managers is further operable to receive a response from the one or more workers.

3. The distributed server computer system of claim 1, wherein each of the one or more backup managers is further operable to aggregate each response received from the one or more workers.

4. The distributed server computer system of claim 1, wherein each of the one or more backup managers is further operable to aggregate each response received from the one or more workers, and further operable to substitute information regarding the connection status of a worker of the one or more workers in place of a response if the worker of the one or more workers is not responding.

5. The distributed server computer system of claim 1, wherein the computer system also comprises the one or more backup managers.

6. The distributed server computer system of claim 1, wherein the computer system also comprises the one or more workers.

7. The distributed server computer system of claim 1, wherein the primary manager is further operable to reassign any one of the one or more workers to a responsive backup manager of the one or more backup managers if the any one of the one or more workers is assigned to a non-responsive backup manager of the one or more backup managers.

8. The distributed server computer system of claim 1, wherein the primary manager is further operable to reassign work assigned to a non-responsive worker of the one or more workers to a responsive worker of the one or more workers.

9. A method for performance by a backup manager in a distributed server system, the method comprising:
receiving a request from a primary manager to begin closing a state of the distributed server system, the state corresponding to an identifier associated with the state;
sending a response to the primary manager indicating that the state corresponding to the identifier has been closed;
receiving a request from the primary manager to broadcast tasks associated with the identifier; and broadcasting the tasks associated with the identifier to one or more workers, wherein the backup manager is operable to store the identifier and the state of the distributed server system corresponding to the identifier, and wherein the backup manager is further operable to replace and assume the function of the primary manager should the primary manager cease functioning, the backup manager being a computer system, the method being performed by the backup manager.

10. The method of claim 9, further comprising persisting the state of the distributed server system.

11. The method of claim 9, further comprising receiving a response indicating the tasks have been performed by the one or more workers.

12. The method of claim 9, wherein the broadcasting the tasks associated with the identifier to the one or more workers further includes sending a request to close the identifier associated with the state of the distributed server system.

13. The method of claim 9, further comprising receiving a response from the one or more workers including new work to be performed.

14. The method of claim 9, further comprising sending a response to the primary manager including one or more new work requests received from the one or more workers.

15. One or more device-readable storage media having device-executable instructions for performing, by a primary manager, steps comprising:
sending a command to one or more backup managers to close a state of a distributed server system, the state corresponding to an identifier associated with the state, wherein at least one of the one or more backup managers is operable to replace and assume the function of the primary manager should the primary manager cease functioning;
waiting a first predetermined time interval to receive a response from each of the one or more backup servers;
determining if the number of backup servers that responded is greater than a predetermined number; and
reassigning one or more workers assigned to one or more backup servers that did not respond to one or more backup servers that did respond, wherein tasks associated with the identifier are broadcast by the one or more backup severs to the one or more workers.

16. The one or more device-readable storage media of claim 15, further comprising waiting a second predetermined time interval for the one or more backup servers that did not respond to respond.

17. The one or more device-readable storage media of claim 15, further comprising receiving information from the one or more backup servers about the responsiveness of the one or more workers.

18. The one or more device-readable storage media of claim 15, wherein the backup manager forwards the command to close an identifier associated with the state of the distributed server system to the one or more workers.

* * * * *